(12) United States Patent
Martin et al.

(10) Patent No.: US 8,081,751 B1
(45) Date of Patent: Dec. 20, 2011

(54) METHOD FOR TRIGGERING CONTENT DOWNLOAD DURING CALL SETUP

(75) Inventors: Geoff S. Martin, Overland Park, KS (US); Jay S. Harmon, Overland Park, KS (US); Boaquan Zhang, Overland Park, KS (US); Jonathan R. Kindred, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1474 days.

(21) Appl. No.: 11/542,713

(22) Filed: Oct. 4, 2006

(51) Int. Cl.
*H04M 1/00* (2006.01)
(52) U.S. Cl. ................... 379/373.01; 455/567
(58) Field of Classification Search ............ 379/373.01, 379/373.02, 374.01, 374.02; 455/401, 567
See application file for complete search history.

(56) References Cited

U.S. PATENT DOCUMENTS

| | | | |
|---|---|---|---|
| 5,774,664 A | 6/1998 | Hidary et al. | |
| 5,887,254 A * | 3/1999 | Halonen | ................. 455/419 |
| 6,009,150 A | 12/1999 | Kamel | |
| 6,018,768 A | 1/2000 | Ullman et al. | |
| 6,330,595 B1 | 12/2001 | Ullman et al. | |
| 6,791,579 B2 | 9/2004 | Markel | |
| 7,006,608 B2 | 2/2006 | Seelig et al. | |
| 7,155,207 B2 | 12/2006 | Chapman et al. | |
| 7,187,761 B2 * | 3/2007 | Bookstaff | ................. 379/201.01 |
| 7,512,421 B2 | 3/2009 | Kim et al. | |
| 7,523,507 B2 * | 4/2009 | Leinonen et al. | ................. 726/32 |
| 7,613,287 B1 | 11/2009 | Stifelman et al. | |
| 7,685,070 B2 * | 3/2010 | Abu-Amara et al. | ........... 705/51 |
| 2002/0024957 A1 | 2/2002 | Azuma et al. | |
| 2002/0067730 A1 | 6/2002 | Hinderks et al. | |
| 2002/0183048 A1 | 12/2002 | Takeuchi | |
| 2003/0002657 A1 | 1/2003 | Seelig et al. | |
| 2003/0086558 A1 | 5/2003 | Seelig et al. | |
| 2004/0001518 A1 | 1/2004 | Gilbert et al. | |
| 2004/0003102 A1 | 1/2004 | DuVall et al. | |
| 2004/0081304 A1 | 4/2004 | Lee | |
| 2004/0184595 A1 * | 9/2004 | Urata et al. | ................... 379/350 |
| 2004/0221304 A1 | 11/2004 | Sparrell et al. | |

(Continued)

FOREIGN PATENT DOCUMENTS

WO 2007073835 7/2007
(Continued)

OTHER PUBLICATIONS

Unpublished U.S. Appl. No. 11/583,396 entitled "Digital Recorder Device for Server Based Content" filed Oct. 17, 2006 in the name of Geoff S. Martin et al.

(Continued)

*Primary Examiner* — Olisa Anwah

(57) ABSTRACT

A method for causing a calling client station to obtain content from a network server in response to a trigger signal received by the client during the ringback period for a call. The trigger signal is transmitted from a ringback server to a calling client station during the ringback period of call setup, whereby the trigger signal, once received and recognized by the calling client station, causes the station to request and obtain content from a network server. In another aspect, a method for providing content to a calling client station by transmitting a trigger signal to the calling client station during call setup, thereafter receiving at a network-based content server a request from the calling client station, generated in response to the trigger, for a content-download, and providing the content-download in response to the request.

10 Claims, 6 Drawing Sheets

U.S. PATENT DOCUMENTS

| | | |
|---|---|---|
| 2005/0105706 A1 | 5/2005 | Kokkinen |
| 2005/0129029 A1 | 6/2005 | Creamer et al. |
| 2005/0137958 A1 | 6/2005 | Huber et al. |
| 2005/0152345 A1 | 7/2005 | Bog et al. |
| 2005/0185918 A1 | 8/2005 | Lowe |
| 2005/0277403 A1* | 12/2005 | Schmidt et al. ............... 455/410 |
| 2006/0135232 A1 | 6/2006 | Willis |
| 2006/0147014 A1 | 7/2006 | Smith et al. |
| 2006/0147021 A1 | 7/2006 | Batni et al. |
| 2006/0165104 A1 | 7/2006 | Kaye |
| 2006/0212347 A1 | 9/2006 | Fang et al. |
| 2006/0285532 A1 | 12/2006 | Radziewicz et al. |
| 2006/0294571 A1 | 12/2006 | Moore et al. |
| 2007/0038513 A1 | 2/2007 | Flax et al. |
| 2007/0055985 A1 | 3/2007 | Schiller et al. |
| 2007/0061229 A1 | 3/2007 | Ramer et al. |
| 2007/0100690 A1 | 5/2007 | Hopkins |
| 2007/0121916 A1 | 5/2007 | Wang et al. |
| 2007/0127705 A1 | 6/2007 | Wang |
| 2007/0168462 A1 | 7/2007 | Grossberg et al. |
| 2007/0168884 A1 | 7/2007 | Weeks et al. |
| 2007/0174230 A1 | 7/2007 | Martin |
| 2007/0189497 A1 | 8/2007 | Bareis |
| 2007/0192468 A1 | 8/2007 | Keeler |
| 2007/0201484 A1 | 8/2007 | Kenrick et al. |
| 2007/0211872 A1* | 9/2007 | Cai et al. ................. 379/142.01 |
| 2007/0250901 A1 | 10/2007 | McIntire et al. |
| 2007/0276726 A1 | 11/2007 | DiMatteo |
| 2007/0286402 A1* | 12/2007 | Jacobson ...................... 379/372 |
| 2008/0037740 A1 | 2/2008 | Yoakum et al. |
| 2008/0075236 A1 | 3/2008 | Raju et al. |
| 2008/0168512 A1 | 7/2008 | Nguyen |
| 2008/0212749 A1 | 9/2008 | Huang |
| 2009/0037949 A1 | 2/2009 | Birch |
| 2009/0055857 A1 | 2/2009 | Gatz |
| 2009/0185669 A1* | 7/2009 | Zitnik et al. ............. 379/217.01 |
| 2010/0296635 A1 | 11/2010 | Bobst |

FOREIGN PATENT DOCUMENTS

| | | |
|---|---|---|
| WO | 2007090173 | 8/2007 |

OTHER PUBLICATIONS

Unpublished U.S. Appl. No. 11/603,615 entitled "Multi-call Ringback Reward Method" filed Nov. 22, 2006 in the name of Robert H. Burcham.

Unpublished U.S. Appl. No. 11/747,716 entitled "Method of Informing a Called Party Which Ringback Tone is Being Played to a Caller During Call Setup" filed May 11, 2007 in the name of Geoff S. Martin et al.

Unpublished U.S. Appl. No. 11/927,122 entitled "Method for Offering Content Download During Streaming Media Sessions" filed Oct. 29, 2007 in the name of Jay S. Harmon et al.

Office Action in U.S. Appl. No. 11/927,122 mailed Mar. 4, 2010.
Office Action in U.S. Appl. No. 11/603,615 mailed Aug. 4, 2010.
Office Action in U.S. Appl. No. 11/583,396 mailed Dec. 27, 2010.
Rahul Chauhan "A Walk Through to IS-95A, IS-95B, CDMA-2000 and Call Processing", Version 2 (Jun. 20, 2003).
G. Camarillo et al., "Early Media and Ringback Tone Generation in the Session Initiation Protocol", IETF Internet Draft (Feb. 10, 2003).
Unpublished U.S. Appl. No. 11/378,442 entitled "Dynamic Provisioning of a Switch With Custom Ringback Media" filed Mar. 16, 2006 in the name of Boaquan Zhang et al.
Office Action in U.S. Appl. No. 11/603,615 mailed Jan. 19, 2011.
Office Action in U.S. Appl. No. 11/747,716 mailed Apr. 12, 2011.
Office Action in U.S. Appl. No. 11/603,615 mailed Apr. 13, 2011.
Office Action in U.S. Appl. No. 11/747,716 mailed Aug. 31, 2011.
Office Action in U.S. Appl. No. 11/603,615 mailed Sep. 14, 2011.

* cited by examiner

US 8,081,751 B1

METHOD FOR TRIGGERING CONTENT DOWNLOAD DURING CALL SETUP

FIELD OF THE INVENTION

The present invention relates to telecommunications services and, more particularly, to downloading content to a calling party's client station in a process initiated by a trigger sent to the calling client station during the ringback phase of call setup.

BACKGROUND

In a traditional telephone network, ringback is typically an audible tone sequence presented during call setup to a caller to signal that the called party's phone is being alerted of the caller's incoming call to the called party. Upon hearing ringback, the caller may generally assume that the called party is receiving a corresponding, concurrent (or nearly concurrent) alert, such as an audible ringtone sequence. The ringback usually continues until either the called party (or a call-handling function, such an answering machine) answers the call or the caller hangs up before the call is answered. The time within the call setup during which ringback is played is typically referred to as the ringback period.

The model for ringback has evolved similarly in both circuit-switched telephony with out-of-band signaling and services (Signaling System 7 (SS7) and Advanced Intelligent Network (AIN), for example), and packet-based telephony, such as Voice over Internet Protocol (VoIP). Ringback tone in these types of systems is typically stored as an audio data file on a network entity, such as a network server, and played out to a caller's phone during call setup when the entity receives a signal, from a terminating switch for example, indicating that the called party's phone is being alerted.

The server-based model of ringback tone storage/playout can support multiple ringback tones, and lends itself to a variety of schemes for customization of ringback tones. An example of customization of ringback tone is a user feature that allows a subscriber in a carrier or service provider network to select one or more ringback tones that will be presented to callers to that user. The carrier or service provider may in turn charge a fee to the subscriber for access to the feature.

SUMMARY

The advent of intelligent client stations in VoIP networks and the continued increase in memory and processing power of cellular phones, together with carriers' drive to develop new revenue streams, have helped spawn new, interactive telecommunication services and features, including customized ringback. However, the potential of ringback tones as the basis for new and/or expanded services beyond just customization has not yet been fully tapped, and consequently, carriers have an interest in developing methods and systems that integrate customized ringback with new services and features that bring value to their subscribers and revenue to their business.

Accordingly, the present invention is directed to a method and system for coupling customized ringback with download of and access to network-based content, in such a manner as to increase the incentive of users both to place calls in the network and to subscribe to new ringback-based services. More particularly, a method and system is disclosed for transmitting a trigger signal from a ringback server to a calling client station (with capabilities described below) during the ringback period of call setup, whereby the trigger signal, once received and recognized by the calling client station, causes the station to request and obtain content from a network server. In a preferred embodiment, users may subscribe to one or more of a variety of ringback-based services that reward callers to those subscribers with trigger-based content-download from a network server. Thus the services may generate subscription-based revenue for the network operator. Once downloaded, the content may thereafter be played, displayed, or otherwise made available to the user of the calling client station, and therefore the service also creates an incentive for users to place calls to known subscribers of the services, and thereby tends to increase call-volume-related revenue for the network operator.

Hence, in one respect, the invention is directed to method and system for causing a calling client station to obtain content from a network server in response to a trigger received by the client during the ringback period for a call. In another respect, the invention is directed to a method and system for providing content to a calling client station by transmitting a trigger to the calling client station during call setup, thereafter receiving at a network-based content server a request from the calling client station, generated in response to the trigger, for a content-download, and providing the content-download in response to the request. Further, the transmission of the trigger during the ringback period of call setup could be accomplished just prior to the start of the ringback tone that is played to the calling client station, or within the ringback tone, either as an integral signal, or possibly in pieces or segments interleaved within the ringback tone to ensure that at least a minimum portion of the ringback tone is received by the client before the entirety of the trigger is received. Note that while the customary term "ringback tone" implies an audible form for ringback, in all of the exemplary embodiments described herein, it should be understood that other forms of ringback media may be possible, including, for example video. Thus, the term "ringback tone" used herein is intended to apply to any and all forms of ringback media that may be presented to and played or displayed upon a calling client station.

The trigger itself preferably contains information that may be used by the calling client station in generating the request for the content-download. For example, the trigger could contain the network address of a content server to which the request should be sent, and possibly an indication of the specific content to be downloaded. Additionally, the trigger could be transmitted inband with the ringback tone, for example as one or more audible dual-tone multi-frequency (DTMF) tones, as a digital parameter or data signal on the paging or control channel to a cellular phone, or in a data packet on a packet-data connection to the calling client station. Other forms of the trigger and trigger transmission are possible as well.

Upon receiving and recognizing a trigger from the ringback server during the ringback period of call setup, the calling client station will preferably generate a request for content from a network-based content server, possibly using information contained in the trigger, as noted. The request may then be transmitted by the calling client station to the content server over a signaling and/or control channel, for example, or over a packet-data connection. Other communication connections between the client station and the content server are possible as well. Further, once generated, the request could be transmitted to (and received by) the content server at various times, for example during the call or after the call is over or released. As a further aspect of the request generation and transmission, the calling client station may first prompt the user for authorization to download the content, and only proceed with the download if the user grants the authorization.

In accordance with the preferred embodiment, the network server will store content in one or more files, and in a variety of formats. As noted, the content on the network server could be audio or video media data. Alternatively, the network server could store or generate upon request one or more digital rights management (DRM) keys that may be used by the downloading client station to unlock media (or other) content that is pre-stored on the calling client station itself. As still a further alternative, the content could be program logic that may be executed by the calling client station once the download is complete. Yet further, the content provided in any particular download could be any combination of the various types mentioned here, or others as well. The network operator preferably has control over the specific content stored on the server, as well as one or more means to access and modify the content.

In exemplary operation, the network-based content server, which could be a web-based server, an AIN server, or other, similar entity, will receive the request for content-download from the calling client station via a network interface. As noted, the request could be received during or after the call. The content server will then process the request and download the requested content to the client, utilizing one or more possible transmission methods, including packet-data transmission, signaling data transmission, or other suitable means. Further, the content could be downloaded at various times, for example, during or after the ringback period, or during or after the call.

Subscribers to the services that provide their callers with trigger-initiated content-download may customize the ringback tones that their callers hear, and the content that gets downloaded could itself be related in some fashion to the ringback tones. For example, content and ringback tones may each be the music of a particular musician or musical group, or may each represent music of the same or similar genres. Further, a given ringback tone could be a portion of an audio music selection, for example a portion of a wave file, while the related content could be the entire selection, such as the whole wave file. Further still, the ringback tone could be a portion of an audio selection, and the content could be a video media file that corresponds to the audio played out as the ringback tone. Other examples are possible as well.

In further accordance with the preferred embodiment, the calling client station will incorporate software and/or hardware capable of carrying out the various client-side aspects of the present invention. Specific client-side capabilities may include, without limitation, DTMF tone detection, recognition/detection of the trigger, pattern recognition, reconstruction of the trigger (for segmented transmission interleaved with ringback tone, as noted above), generation and transmission of the request, reception of the content-download, and playout of, display of, or other access to the downloaded content. These and possibly other client-side capabilities may be implemented on the calling client station in software, firmware, and/or hardware. Note also that the calling client station could be any one of a number of possible devices, such as a wireless cellular device capable of both circuit-based and packet-data-based communications with a provider network, a wireless local area network device, such as a hand-held computer or VoIP phone, a wired VoIP phone, or other type of communication station.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Figure 1:
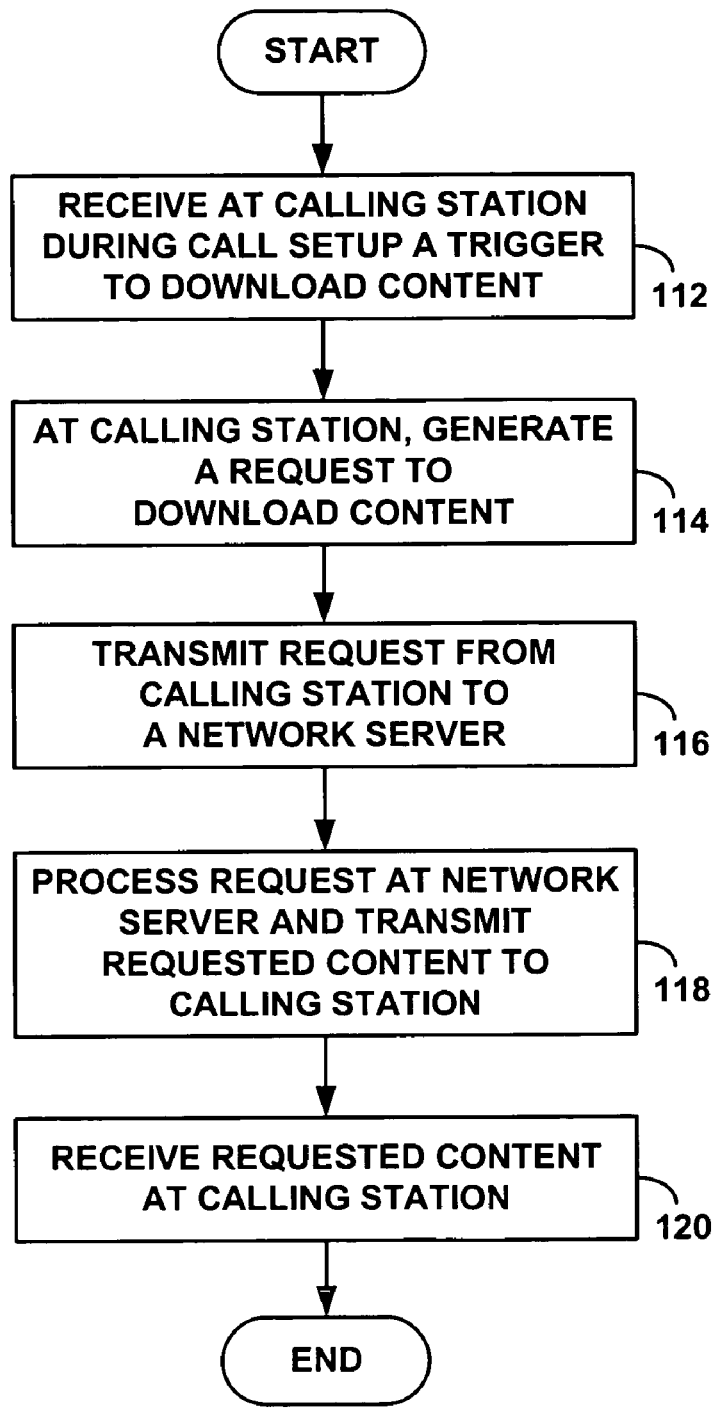
FIG. 1 is an exemplary flowchart of the method representing a process by which trigger-initiated download of content to a calling client station during call setup can be carried out.

An exemplary embodiment of the present invention is illustrated in the form of a flowchart in FIG. 1. At step 112, a calling client station receives a trigger during call setup, wherein the trigger causes the client to initiate the process of content download. The trigger could be transmitted by a ringback server to the calling client station just before the start of, or during the ringback period of call setup, for example. It could be transmitted in its entirety, or transmitted in segments that are interleaved within the ringback tone. Further, as mentioned above, the trigger could contain information related to the download, including, for example, one or more indicators of the content to be downloaded and the address of a network server from which the content should be obtained.

At step 114, the calling client station, responsive to receiving and recognizing the trigger, generates a request to download the content. The request could contain information that identifies both the client station (and/or the user of the station) and the ringback tone. The latter may be used to associate the specific content with the particular ringback tone played out during call setup, for example. The request is then transmitted to a network-based content server at step 116. Exemplary methods and means of transmission may include, without limitation, a circuit signaling channel, and a packet-data connection.

Once received by the network-based content server, the request is processed, as indicated at step 118. This may include authenticating the request and interpreting the contents in order to determine the appropriate content for download. Step 118 also includes transmitting the requested content to the calling client station. Again, various possible methods and means of transmission are possible. Transmission of the content to the calling client station constitutes the content-download.

Finally, at step 120, the calling client station receives the content. Depending on when during the call setup the trigger is received by the calling client station and the corresponding request is sent to the content server, the download may occur during or after the ringback period, or during or after the call, for example. Although not explicitly shown in FIG. 1, once the download to the calling client station is complete, the device may play, display, or otherwise output the content for the user of the calling client station.

It should be understood that the steps depicted in FIG. 1 are illustrative of the invention, and that other embodiments are possible. In addition, the details described above in connection with the steps are exemplary, and represent only a selection of possible elaborations of the embodiment. Furthermore, the details could be explicitly included in additional steps, and the ordering of certain steps could be modified.

Network Architecture and Client Station Access

Figure 2:
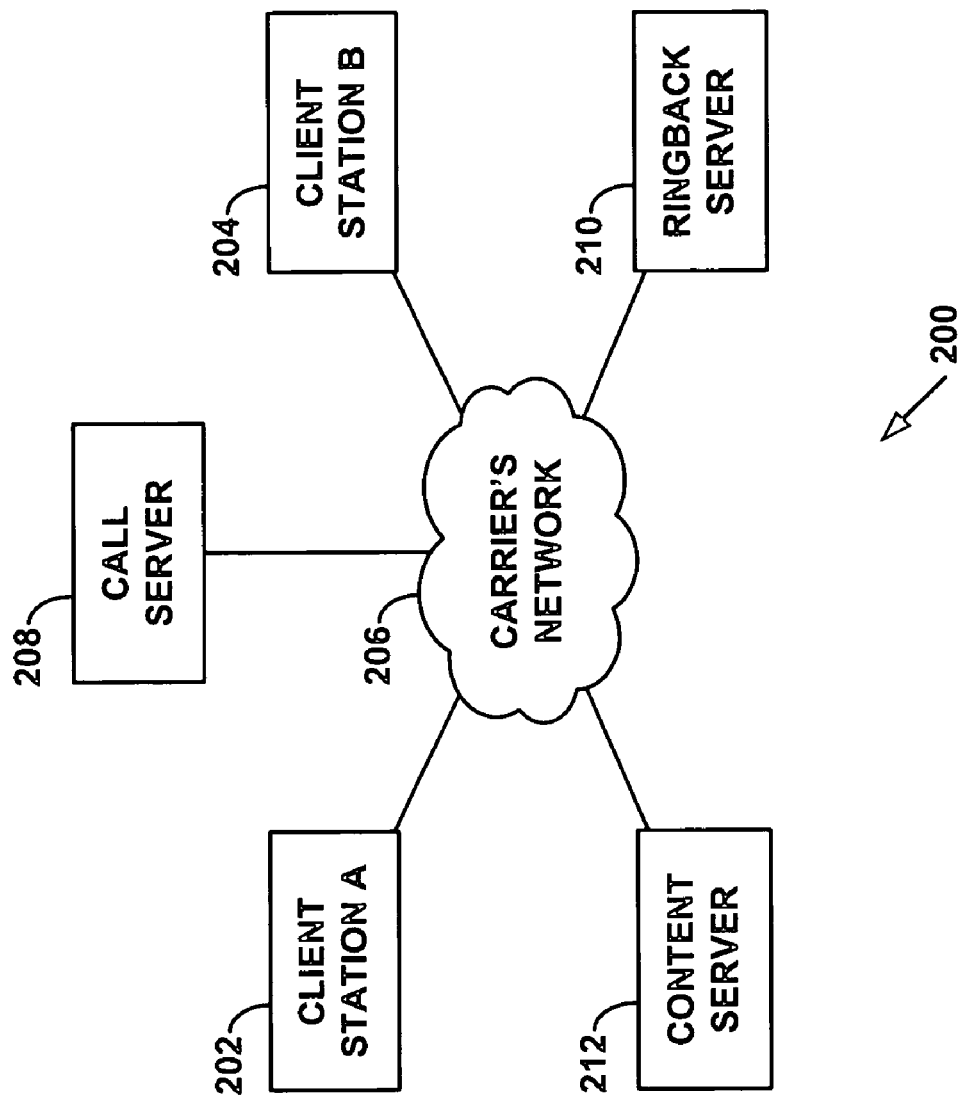
FIG. 2 is a simplified representation of a carrier network in which trigger-initiated download of content to a calling client station during call setup can be carried out.

FIG. 2 illustrates a simplified version of an exemplary network 200 that could be owned and operated by a service provider in order to carry out trigger-initiated download of content to a calling client station during call setup. Network 200 includes carrier's network 206, which supports communication among representative, connected devices and network elements, namely, client station A 202 and client station B 204, call server 208, ringback server 210, and content server 212. It should be understood that other entities and elements, although not shown, could be included network 200. In exemplary operation of the present invention in the context of FIG. 2, a user at client station A could call another user at client station B. Call server 208 may facilitate call setup for such a call, for example, performing call control and signaling to route the call and to coordinate and/or allocate any necessary network resources, such as bearer channels. During call setup, call server 208 may send client station B an alerting signal and at the same (or nearly the same) time, send a signal to ringback server 210 to transmit a particular ringback tone to client station A. Ringback server 210 may then transmit to client station A a ringback tone that includes a trigger that, when received by client station A, causes the client station to generate and send a request to content server 212. Upon receiving the request, content server 210 may then download the requested content to client station A.

As illustrated in FIG. 2, network 200 is a generic representation of certain aspects of the present invention. In practice, however, network 200 could take on various forms. For example, carrier's network 206 could be a circuit-switched telephony network, client stations 202 and 204 could be landline telephones, and call server 208 could be a telephony switch. Alternatively, client stations 202 and 204 could be cellular phones, and call server 208 could be a mobile switching center (MSC). Further, call server 208 could represent multiple devices of the same or different types. For example, call server 208 could represent one or more telephony switches and one or more MSCs. In such an exemplary embodiment, one client station could be a cellular phone and the other a landline phone.

In yet another embodiment, carrier's network 206 could be a packet-switched network, such as an Internet Protocol (IP) network, which supports VoI? calls using a protocol such Session Initiation Protocol (SIP) or H.323. In this embodiment, client stations 202 and 204 could be SIP or H.323 client stations that have wired and/or wireless access to network 206, and call server 208 could be a SIP proxy server or an H.323 gateway. These exemplary forms of network 200 are meant as illustrations, and others are possible.

In all of these and other possible embodiments, the basic operation of the invention is similar, namely, (i) transmitting a trigger from a network entity such as ringback server 210 to the calling client station during call setup, (ii) responsively generating at the calling client station a request to download and/or access content, (iii) sending the request to a network entity such as content server 212, and (iv) thereafter receiving and/or accessing at the calling client station the requested download. It should be understood that this summary of the basic operation is exemplary, and that in practice, there may be many variations of the specific steps, as well as of the numbers and types of clients and network entities and elements involved, all within the scope of the present invention.

Figure 3:
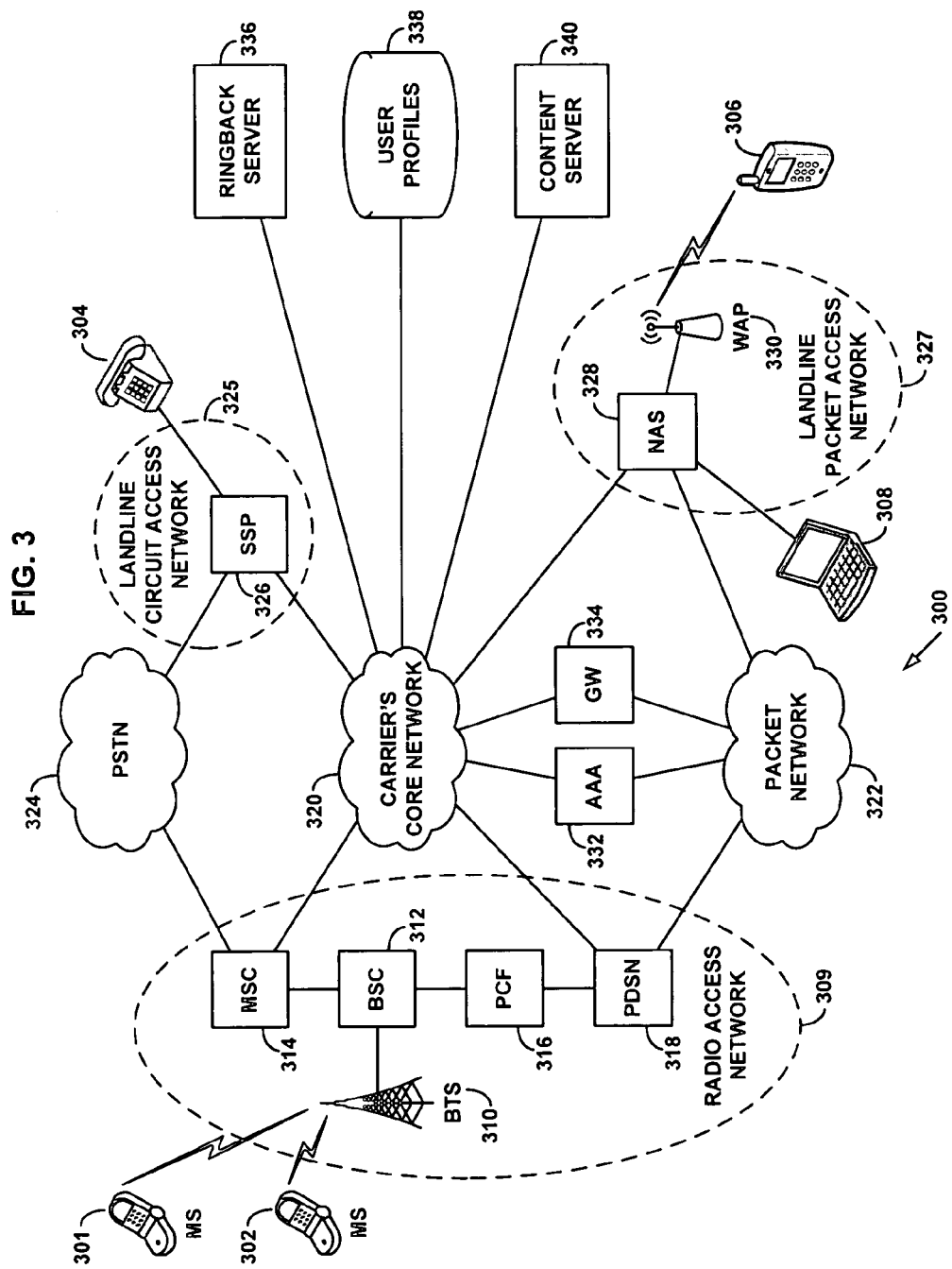
FIG. 3 is an exemplary representation of a carrier network in which trigger-initiated download of content to a calling client station during call setup can be carried out.

Further exemplary embodiments of the invention may be understood by considering FIG. 3, which depicts a more detailed representation of a telecommunication network 300 that includes, by way of example, network elements and components suitable for supporting both circuit-based telecommunication services, such cellular and landline voice calls, and packet-based data communication services, such as web browsing, VoIP, and e-mail communication.

Example network 300 includes a carrier's core network 320, which is then connected to one or more access networks/systems, such as a radio access network (RAN) 309, landline circuit access network 325, and landline packet access network 327, each of which may allow subscribers to engage in telecommunication services such as voice telephony and data communications. Each of the access networks is coupled, in turn, with one or more transport networks, such as the public switched telephone network (PSTN) 324 and (either directly or through core network 320, via gateway (GW) 334) a packet network 322. Also connected with the core network 320 is a ringback server 336, a user profiles database 338, and a content server 340, which together with other aspects of network 300 and connected user client stations comprise elements of a preferred embodiment of a system and method for the trigger-initiated content-download to a calling client station during call setup, as explained further below.

Core network 320 provides connectivity to various elements, components and entities of network 300, and serves as a transport network for communications among them. Operationally, core network 320 also supports delivery of circuit-based user services and features via signaling and bearer channels, for example, carried over inter-switch digital trunks for regional and long-distance calls. As such, core network 320 may also comprise what is commonly referred to as a backbone network. Core network 320 could be an ATM and/or IP-based network, for example, and could comprise more than one physical and/or logical network and/or sub-network, as well as interconnecting routers and switches. Other transport technologies are possible as well, as are a variety of network topologies and routing/switching protocols and platforms.

In the context of FIG. 3, core network 320 represents at least the communicative coupling of the attached elements shown, as well as other possible entities that are not shown. Note, however, that the exemplary connectivity between network entities provided via core network 320 is not intended to be limiting with respect to other methods or means of communication between any two or more network entities, elements or components. For example, a group of servers and databases that supports a coordinated set of functions, such as billing or user account services, could communicate within an IP sub-network or LAN that is itself connected to core network via a router, or the like. Other arrangements are possible as well.

As noted above, exemplary network 300 also includes packet network 322, which may be a different physical network from core network 320, a separate virtual network overlaid on core network 320, or some combination of both. Other arrangements are possible as well. Packet network 322 provides packet-data transport and services to users and to network servers and other network entities that require packet-data communications. In a preferred embodiment, packet network 322 is an IP network, capable of supporting, for instance, web browsing, VoIP, and other Internet-like services. Although not shown in FIG. 3, packet network 322 may also include various servers for packet-based services, and provide connectivity to other packet networks, for example those of other service providers, or the public Internet.

Users may access features and services of network 300 via one or more client stations, exemplified in FIG. 3 by client access devices 301, 302, 304, 306, and 308. Each illustrates by way of example a different mode and technology of network access, as well as a different form of client station. For example, mobile stations (MSs) 301, 302 represent third-generation (3G) cellular phones, or the like, that may support both circuit-cellular and packet-data communications using CDMA and/or GPRS/GSM cellular radio access technologies, for instance. Telephone 304 represents a landline telephone, such as one used for circuit-based residential service with a local exchange carrier (LEC). Alternatively, telephone 304 could be a digital PBX phone that accesses the LEC via a PBX switch (not shown), for example. Client station 306 represents a wireless intelligent device, such as a packet-telephony (e.g., VoIP) phone, or the like, with wireless local area network (WLAN) access, such as IEEE 802.11 (also referred to as "wireless Ethernet"), to a packet network. Likewise, client station 308 could be a similar type of intelligent device, but with wired LAN access, such as Ethernet, to a packet network. These example client stations are not meant to be limiting, and other types and/or combinations of devices are possible. For instance, client station 306 could be a personal computer (PC) or workstation having a WLAN interface, and client station 308 could be a wired VoIP phone. Further, MS 301, 302 could incorporate technology for WLAN access as well as cellular radio access to a packet-data network, thus supporting so-called dual-mode capability.

Client stations preferably access network 300 via one or more of the connected access networks, each of which comprises at least one switch, router, or similar entity that includes one or more interfaces to network 300. For example, cellular radio access to network 300 by wireless devices, such as exemplary MS 301 and MS 302, is provided by RAN 309. As illustrated in FIG. 3, RAN 309 comprises base transceiver station (BTS) 310 connected to the network via base station controller (BSC) 312, which in turn is connected both to the circuit-cellular network via MSC 314, and to the packet-data network via packet data serving node (PDSN) 318, by way of packet control function (PCF) 316. PDSN 318 also includes a connection to core network 320.

In typical operation of RAN 309, BTS 310 provides an air interface link to MS 301, 302 (or similar device), while BSC 312 controls BTS 310, for example assigning specific air interface channels and managing mobility of MS 301, 302 across possibly multiple BTSs under its control. For circuit-cellular services, such as circuit-based telephony, communications are then routed between BSC 312 and MSC 314, which in turn provides connectivity to core network 320, to one or more other MSCs or circuit telephony switches (either directly or via core network 320), or to PSTN 324 via digital trunks or similar links to a switch or switches in the PSTN. For packet-data services, such as web browsing and IP multimedia services, communications are instead routed between BSC 312 and packet network 322 via PDSN 318, by way of PCF 316. It should be noted that even though MS 301 and MS 302 are both shown in FIG. 3 to be associated with RAN 309 for illustrative purposes, in practice they need not actually be associated with the same BTS, BSC, MSC, PDSN, or even the same RAN.

The components of RAN 309 illustrated in FIG. 3 represent functional elements, and although only one of each is shown in the figure, a given deployment may in practice include more than one of any or all them in various configurations. For example, as noted above, a given BSC could control multiple BTSs. Further, an MSC could in turn control multiple BSCs, and a given metropolitan area could include multiple MSCs or even multiple RANs connected via carrier's core network 320 or other interconnecting network, for example. Still further, multiple metropolitan areas, each with a hierarchical arrangement of MSCs, BSCs, and BTSs, or with multiple RANs, for example, could be connected via the carrier's backbone network (e.g., core network 320). Similar arrangements of one-to-many are also possible for PDSNs-to-BSCs as well, as are other configurations. The above examples are not mean to be exhaustive or limiting.

Additionally, each functional element of RAN 309 may be implemented as a separate physical entity, or various combinations of them may be integrated into one or more physical platforms. For example, BTS 310 and BSC 312 may be implemented in a single physical device. Similarly, PCF 316 and PDSN 318 could be combined on a single platform. Other physical configurations of the functional elements of the RAN may also be realized.

Access to landline circuit-based services in network 300, such as conventional circuit-switched telephony, is preferably provided by landline circuit access network 325. Represented in FIG. 3 by a single service switching point (SSP) 326, landline circuit access network 325 typically comprises one or more conventional telephony switches (or similar network entities) at the end office (or offices) of a LEC, for instance, together with interconnecting digital trunks and tandem switches. Similarly to MSC 314, SSP 326 in turn provides connectivity to core network 320, to one or more other SSPs or MSCs (either directly or via core network 320), or to PSTN 324 via digital trunks or similar links to a switch or switches in the PSTN. Access by a device such as telephone 304 to SSP 326 could be via residential local loop, or a digital or analog line to an intervening PBX switch (not shown), for example. Other arrangements are possible as well.

Access to landline packet-data services in network 300, such as web browsing, VoIP, and email communications, is provided by landline packet access network 327. Represented in FIG. 3 by a single network access server (NAS) 328, landline packet access network 327 could comprise a local area network (LAN), such as an enterprise network, a packet-cable distribution system, a cable modem distribution system, a digital subscriber line (DSL) distribution system, or the like, which provides connectivity between landline subscriber stations and NAS 328. In turn, NAS 328, which could comprise one or more routers, DSL switches, cable modem termination systems, or remote-access chassis, for example, provides connectivity to packet network 322, as well as to core network 320. Alternatively or additionally, landline packet access network 327 may comprise a landline telephone system that provides dial-up connectivity between landline subscriber stations utilizing modems, for example, and NAS 328. Intelligent devices such as client station 308 may have wired connectivity, such as Ethernet, to landline packet access network 327. Preferably, landline packet access network 327 also includes one or more wireless access points (WAPs), such WAP 330, to support wireless WLAN access technologies, such as wireless Ethernet (IEEE 802.11), for example, for devices such as wireless client station 306.

Although not shown in FIG. 3, note that other switches may be present in the telecommunication network 300 as well, interconnected by core network 320 or other transport networks, for example. For instance, an inter-exchange carrier (IXC) may provide a switch (e.g., Nortel DMS-250) that serves a connection between LEC switches, MSCs or other regional telecommunication systems, so as to facilitate long distance and other inter-switch calling. As another example, private switches (e.g., PBX servers) might be provided to serve enterprises or other groups of subscribers (e.g., hotels, campuses, etc.) Other examples are possible as well.

Delivery of circuit and packet-data services to users may involve additional network servers, entities, and subsystems which are part of network 300, but which have been omitted from FIG. 3 for the sake of brevity. For example, signaling for setup and management of circuit-based calls and services may be provided by a signaling subsystem/network such as SS7. Thus, while MSC 314 and SSP 326 may comprise certain aspects of an SS7 system, or the like, other elements that make up the system but are not shown could also be connected via core network 320. Similarly, packet-based telephony, such as VoIP, may be supported by network servers SIP proxy servers, or the like, which, although again are not shown, may be connected via packet network 322. Other network-based servers for packet-based services may also be present in network 300.

Exemplary Operation of Trigger-Initiated Download of Content During Call Setup

The trigger-initiated download of content to a calling client station during call setup introduced in the Summary above may be carried out in exemplary network 300, and could form the basis of a variety of services that a service provider could then offer to its subscribers according to one or more fee structures, for example. In the following discussion, the term "ringback-content service" is used to refer both to the underlying system and method for such trigger-initiated content-download, as well as to a generic designation that a service provider might give to the derived service(s) offered to its subscribers.

In a preferred embodiment, a client station accesses ringback-content service using software and/or hardware incorporated for that purpose, while the service is delivered during call setup by ringback server 336, user profiles database 338, and content server 340, in coordination with other call control and signaling entities of network 300, as described below. Note that, as with other elements shown in FIG. 3, ringback server 336, user profiles database 338, and content server 340 represent functional elements that could take various forms in practice. For example, user profiles database 338 could be maintained in association with a signaling control point (SCP) in an SS7 network, or with a home location register (HLR) in a cellular wireless network, for example. Other combinations or configurations are also possible. Further, while ringback server 336, user profiles database 338, and content server 340 are all shown to be directly connected to core network 320 in FIG. 3, any or all of them could instead be part of a sub-network or LAN, for example comprising a backend services subsystem, which could in turn be connected to core network 320. Alternatively, they could be connected to packet network 322, either individually or, again, as part of some form of service subsystem. Other arrangements are possible as well.

Figure 4:
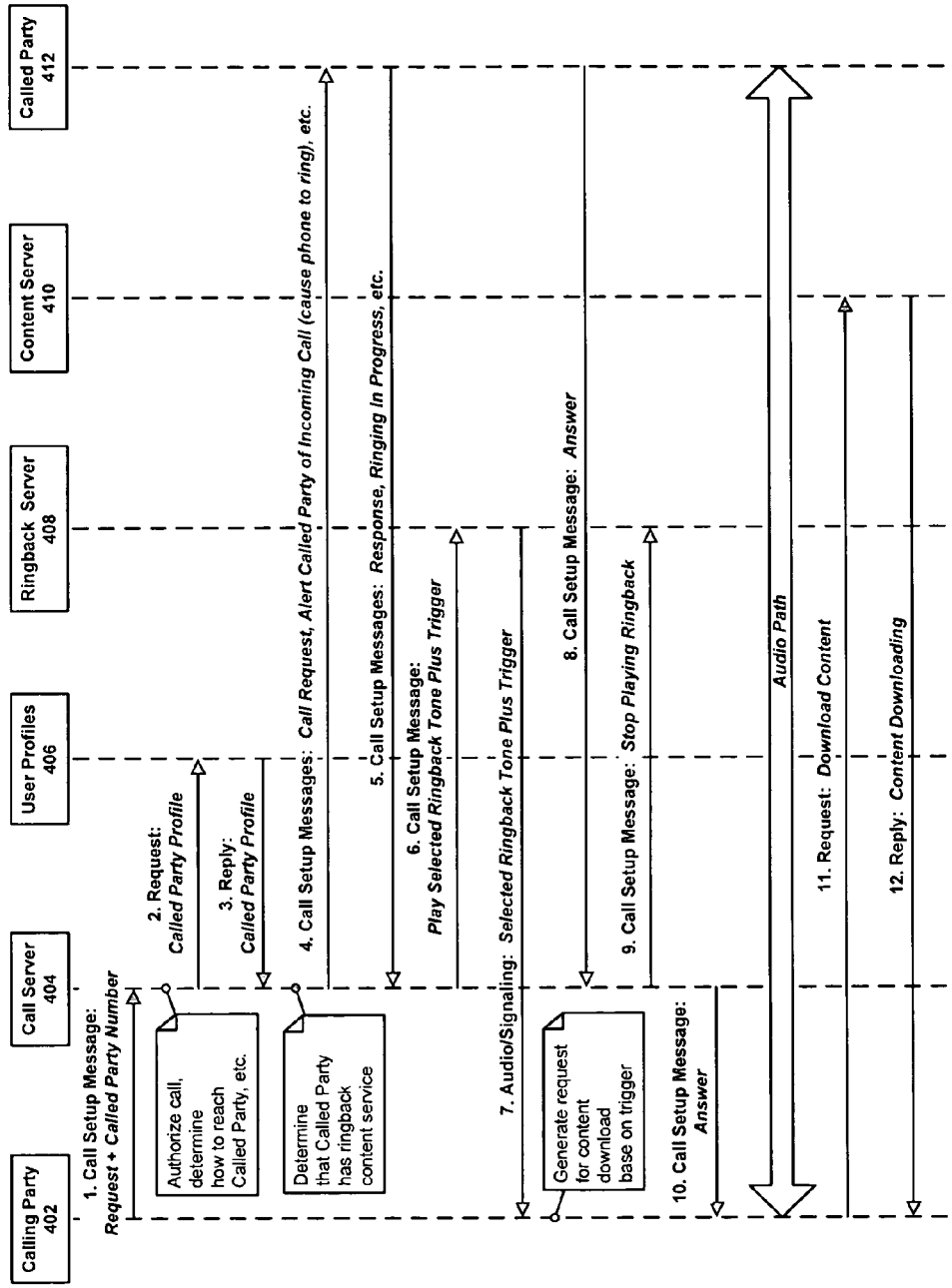
FIG. 4 is an exemplary pseudo-call-flow illustrating the operation of trigger-initiated download of content to a calling client station during call setup with respect to the components and entities involved, and the information that passes between them in the process.

While certain aspects of the ringback-content service may vary depending on the type of call being set up (e.g., circuit-based or packet-based), the basic operation is similar for all call types, and can be understood by considering the exemplary pseudo-call-flow illustrated in FIG. 4. In the following explanation of the pseudo-call-flow, it is assumed that the called party is a subscriber to ringback-content service, and that the calling client station incorporates the appropriate client-side software and/or hardware.

At step (1), the calling party 402 sends a call request to network call server 404 (such as an MSC or a SIP proxy server) which mediates the call setup. The call request includes the phone number of called party 412, or similar identifier. Call server 404 authorizes the call, and then determines how to reach called party 412, for example by querying a location server or network registration agent (not shown). At step (2), call server 404 requests the called party's profile from user profiles 406, a database containing user account and profile information (such as user profiles database 338 in FIG. 3), and receives a reply in step (3).

The returned profile may be in the form of a record or other output data format, and may contain various types of information used by call server 404 to process the call, such as authorizations, call-handling preferences, etc. In addition, the profile will also contain an indicator that called party 412 subscribes to ringback-content service, and may further include a pointer to a specific ringback tone that should be played, possibly conditioned upon the identity of the particular calling party.

At step (4), call server 404 sends one or more messages to place the call to called party 412, ultimately causing the called party's phone to ring. Assuming the called party's phone is not busy, one or more messages are returned in step (5) including an indication that ringing is in progress. (Note that steps (4) and (5) are meant to represent possibly multiple, interleaved messages and/or transactions, even though they are shown in FIG. 4 as a single arrow in each direction.)

At step (6), call server 404 signals to ringback server 408 (such as ringback server 336 in FIG. 3) to transmit the selected ringback tone plus the trigger. At step (7), ringback tone and the trigger are transmitted by ringback server 408 and received by the calling client station. The transmission may take the form of playout of an audio file, DTMF tones, or a combination, for example. Alternatively, the transmission may be in the form of a packetized data message. Note that in the case of audio playout, it is assumed that an audio path between ringback server 408 and calling party 402 will first be established (although this step is not explicitly included in FIG. 4).

Responsive to recognizing the trigger, the calling client station generates a request for the download of content. For example, the trigger may invoke specific client-side software on the calling client station that generates the request. The trigger also includes the identity and/or location of content server 410 (such as content server 340 in FIG. 3) to which the request should be sent. In addition, the specific content to be requested could also be embedded in the trigger, or may instead be determined by content server 410.

At step (8), called party 412 signals to call server 404 that the call has been answered. Call server 404 then sends a message to ringback server 408 in step (9) to stop playing the ringback tone. At step (10), call server 404 informs calling party 402 that the call has been answered, and the call then proceeds (audio path is established). In steps (11) and (12), called party 402 sends its request for the download to content server 410, and content server 410 responds by transmitting the content back to the called party's client station.

The pseudo-call-flow of FIG. 4 corresponds to a generalized description of ringback-content service. It should be understood that, for an actual system in practice, different network components may be employed, and specific protocols and messages will be used. Examples include, without limitation, IS-41 and related messages in a circuit-cellular-based system, or SIP and related messages in packet-based VoIP system. Moreover, the steps may vary in order and number depending upon the type of call being placed, as well as the specific implementation within the network context that supports the particular call type. For example, for a circuit-based call, there may be additional steps associated with establishing various legs of the end-to-end bearer channel (circuit). Similarly, for a packet-based call, there may be steps that establish send and receive ports on client stations. There may be other alternative steps, as well. For instance, the user profile request/reply transaction of steps (2) and (3) may instead be an authorization transaction in which the called party's profile (or a subset of the profile information) is included in the reply to the call server. Further, the trigger could be transmitted in sequential segments during the ringback phase of call setup, and reconstructed by the calling client station, for example. Additionally, the download could occur during the call, once the call completes, or at a later time, for instance. Some of these additional details and variations are addressed in relation to specific call types discussed below.

In order to further elaborate the preferred embodiment, ringback-content service is described in the following paragraphs by way of example with respect to both circuit-based and packet-based calls, as well as to calls that interconnect circuit-based calls with packet-based calls (using GW 334 or a similar entity to transcode media data and translate signaling protocols, for example). In each of the exemplary call scenarios, a calling party places a call to a called party, wherein the called party is again taken to be a subscriber to ringback-content service in the network of the called party's service provider. The calling party may or may not be a subscriber to the service, but, as above, the client station of the calling party is assumed to incorporate software and/or hardware for carrying out the described client-side aspects of ringback-content service. It should be understood that these call scenarios illustrate different exemplary contexts for the invention, and are not intended to limit its scope.

Referring again to FIG. 3, a preferred embodiment of ringback-content service may be described in a cellular-circuit-based call in network 300. In such a call, all or part of the bearer channel between the participating client stations comprises time division multiplexed (TDM) digitized media samples carried on a dedicated circuit, such a DS-0. By way of example, a call is placed from a calling party at MS 301 to a called party at MS 302, where MS 302 is associated with a subscriber to ringback-content service. Without loss of generality with respect to ringback-content service, it may be assumed that both MS 301 and MS 302 are associated with the same MSC 314 of the same RAN 309. However, it should be understood that the embodiment does not require the common association, and that the operation described could easily be adapted to a configuration in which the two client stations are associated with different RANs or different elements of the same RAN. Further, MS 301 and MS 302 could switch roles as calling and called client station, respectively, without impacting the embodiment. The call is placed from MS 301 by transmitting a call request with the dialed digits (or other identifier) associated with MS 302 to RAN 309. For a circuit-cellular call, an appropriate air-interface channel and landline bearer channel will be allocated for the call, and the request will be forwarded to MSC 314 via BTS 310 and BSC 312 for further processing.

Upon receipt of the call request, MSC 314 may send an IS-41 LOCREQ message to an HLR (not shown in FIG. 3), for instance, in order to locate MS 302 (in this example assumed to be associated with MSC 314), and may then consult user profiles database 338 (or similar network database) to determine that the user of MS 302 is a subscriber to ringback-content service. For example, an indication that the user is a subscriber to ringback-content service could be contained in a user profile returned in response to a query by MS 314 to user profiles database 338. Alternatively, user profiles database 338 could be part of the HLR, as noted above, in which case the profile could be returned in an IS-41 LOCREQ response from the HLR. As a further alternative, the user profile (or similar information) could be returned to MSC 314 as part of a routine call setup transaction (e.g., an authorization step, or other inbound call-handling action), or a transaction related specifically to ringback-content-service, noted above in connection with steps (2) and (3) in FIG. 4. Also as noted above, the information related to user subscription to ringback-content-service may also specify a particular ringback tone to play out to the caller.

Next, MSC 314 routes the call to MS 302. This may involve paging MS 302 in order to wake up the client station and to cause it to request an air interface channel, for example. Details of how this occurs are well-known in the art, and are not discussed further here. Once a bearer channel to MS 302 is established and the called client station acknowledges an alerting signal from MSC 314 by sending a ringing message, for example, MSC 314 then contacts ringback server 336 in order to request that it transmit an appropriate ringback tone and trigger to calling client station MS 301. Preferably, ringback server 336 maintains multiple ringback tones in one or more file formats, such as digital data or audio files, and can selectively transmit ringback tones upon request. In accordance with an aspect of ringback-content-service that provides for the customization by the subscriber of ringback tones, the tone or tones to be played out on calls to MS 302 may be provisioned in the user profile of the subscriber associated with MS 302 (for example by the subscriber, via a web-browser interface). Triggers may also be stored on ringback server 336 for transmission upon request, or possibly generated at the time a transmission is requested. Accordingly, MSC 314 may specify in its request to ringback server 336 a particular ringback tone and trigger based upon information in the user profile of the called party, for example. Alternatively, the ringback tone may be specified in the user profile and included in the request, while the trigger is determined by one or more settings of ringback server 336. Other arrangements are possible as well.

As noted in connection with FIG. 4, the transmission of the ringback tone and trigger to MS 301 could take various forms, including, without limitation, audio playout, DTMF tones, or packetized data. For audio playout, MSC 314 may also ensure that the ringback server 336 is connected to the bearer channel to MS 301, so that the ringback tone will be heard by the caller and the trigger received by the client station. Thus, the request/response transaction between MSC 314 and ringback server 336 could preferably take the form of a circuit call setup. For instance, MSC 314 could send ringback server 336 an ISUP IAM, and ringback server 336 could respond with an ISUP ACM, followed by an ISUP ANM. Alternatively, for packetized data, MSC 314 could supply ringback server 336 with a contact address or identifier for MS 301, for instance. Ringback tone will be played out to MS 301 until the called party answers the call and the called party's client station (MS 302 in this example) sends a corresponding message to MSC 314 (e.g., an ISUP ANM). Note that the call could be answered by a person, an answering machine, or some other call-handling function. When MSC 314 detects the answer message, it will take action to end playout of ringback tone to MS 301, such as cutting off the audio channel and/or directing ringback server 336 to cease playout of the ringback tone. At this point, the calling and called party may proceed with media exchange (e.g., conversation) or other transactions.

The trigger itself could be transmitted with or independently of and/or by different means than the ringback tone. For example, the trigger may preferably be transmitted inband as one or more DTMF tones, and be received in full at the start (or just prior to the start) of the ringback period. Alternatively, the trigger may comprise a series of inband signals, such as DTMF tones, embedded in the ringback tone and pieced together by MS 301 over the course of playout of the ringback tone. In either of these alternatives, MS 301 (or similar device) may include a DTMF tone detector and related software in order to be able to recognize and decode the trigger tones and reconstruct the trigger. In still another embodiment, the trigger could be transmitted as an out-of-band signaling message, for example using the paging channel. In this case, MS 301 could include software operable to interpret the out-of-band message and extract or reconstruct the trigger. These exemplary embodiments should not be viewed as limiting.

When received and recognized by MS 301, the trigger will then cause the client station to invoke a client-side program (e.g., stored as software or firmware) that generates a request for content download. Preferably, the trigger will contain information that the program uses in generating the request. For example, the trigger could include the identity of a network server to which the request should be sent, such as a network address. Further, the trigger could include a name of, and/or a pointer to, specific content that should downloaded in response to the request. For example, the name or pointer may somehow relate the requested content to the ringback tone (e.g., according to theme or genre of a musical ringback tone, for instance).

Once the request is generated, MS 301 will preferably transmit the request to a network entity, such as content server 340, in order to invoke the download. Alternatively, the client station (MS 301) may first prompt the user for authorization to request the download. If the user grants the authorization, then the request may be transmitted; otherwise, if the user denies the authorization, the request may be discarded without transmission. The request may be transmitted over a cellular messaging channel, and be routed to content server 340 via MSC 314 and core network 320, for example. As an alternative, content server 340 may be a web-based server and MS 301 may establish (or use an existing) data connection to transmit the request using via data network 322. Further, the request could be transmitted during or after the call. Other examples are possible as well.

Upon receiving the request from MS 301, content server 340 will preferably process the request and download the requested content to MS 301. In a preferred embodiment, content server 340 will authenticate the request, and then extract information from the request that identifies the particular content to be downloaded. Preferably, content server 340 maintains content in one or more files of various formats, such audio files (e.g., a wave files) and/or video file (e.g., mpeg files) suitable for playing by one or more programs on a client station such as MS 301. Other forms of content could comprise text-based files or photographs for display upon download, and/or storage for later viewing. Alternatively, the content could be one or more digital rights management (DRM) keys that may unlock media or other content that was already stored on MS 301 before the call. As still another alternative, the content to be downloaded could be software logic stored as digital media in a file, and comprises executable instructions when transferred to and invoked on MS 301. As yet a further alternative, the content to be downloaded may comprise a combination of media data, media-storable software logic, and one or more DRM keys.

In accordance with the preferred embodiment, downloading the content comprises selection by content server 340 of one or more of the files on the basis of the request, and then transmission of the selection(s) to MS 301, for example. Content server 340 preferably transmits the content to MS 301 over a control channel, for example. If content server 340 is a web-based server, then the download could instead be transmitted over a packet-data connection to MS 301. Other methods and means for download are also possible, and as with transmission of the request, the download could occur during or after the call.

Once MS 301 receives the downloaded content, it may then make it available to the user through one or more programs executable on the client station. If the content is a media file, then it may be played by MS 301 either automatically upon download, stored on MS 301 for playout at a later time upon request by the user, or both. If the content is media-storable software logic, then it may similarly be executed upon download, stored on MS 301 for later execution, or both. Further, if the content is a DRM key, then the DRM key may be used to automatically unlock other media or data that were preloaded (prior to the call) on MS 301, for example when the device was manufactured, or initialized for use by the provider, or during an update transaction with the network. The above examples are not intended to be limiting.

Exemplary operation of ringback-content service in a packet-based call proceeds in a similar manner to that of a circuit-based call, except that, rather than TDM media transmission, the sequential groupings of media data samples are carried in data packets over a packet-switched network, and the call setup and signaling are performed according to packet-telephony protocols by servers in the packet network. In a preferred embodiment, the packet network is an IP network and calls are supported using well-known VoIP protocols. For example, media data are transmitted using the real-time transport protocol (RTP), and signaling is based on SIP, carried out by SIP-compliant network servers (e.g., SIP proxy servers). Additionally, client stations are SIP enabled (e.g., SIP user agents). In further accordance with the preferred embodiment, ringback server 336, user profiles database 338, and content server 340 are all connected, in one way or another, to packet network 322. Without loss of generality, it may be assumed that they are all IP-based network servers, although other configurations are possible as well. It is even possible that all three components are the same as the ones used for circuit-based calls, and that their functionality is shared within network 300 for all call types.

In an exemplary packet-based call, the calling party at cellular wireless client station MS 301 in FIG. 3 places a SIP-based VoIP call to the called party at intelligent client station 306. As above, the called party is a subscriber to ringback-content service, and MS 301 incorporates appropriate client-side software and hardware. Note that MS 301 and intelligent client 306 could switch rolls as calling and called devices, respectively, and further, MS 302 and/or intelligent client 308 could be substituted for either the calling party or called party, respectively, without loss of generality with respect the present embodiment of ringback-content service.

In further accordance with the preferred embodiment, MS 301 (or similar cellular wireless device) will first establish a data connection to the IP network (e.g., packet network 322) via PDSN 318. For example, in RAN 309, PDSN 318 may receive an origination message from MS 301 (via BTS 310, BSC 312, and PCF 316), seeking to establish a packet-data session. Upon authentication and authorization of the subscriber via a query to authentication-authorization-accounting (AAA) server 332, PDSN 318 may then grant the request. Exemplary packet data sessions could include a point-to-point protocol (PPP) session between MS 301 (or similar device) and the PDSN 318, and a mobile Internet Protocol (Mobile IP) session between MS 301 and a Mobile IP home agent (not shown in FIG. 3). In response, PDSN 318 may negotiate with the MS 301 to establish a data-link layer connection, and PDSN 318 or a Mobile IP home agent may assign an IP address for the MS 301 to use in communications on the packet network 322. A packet data session is thus established and packet data communications to and from MS 301 may then flow through the PDSN 318 during the session.

With a packet-data session established and an IP address assigned, the user of MS 301 may then register its SIP contact information with an appropriate SIP proxy/registrar. The related procedures are well-known in the art, and are not described further here. It is also assumed that the user of intelligent client 306 is similarly registered with a SIP proxy/registrar. Note that the two exemplary client stations need not register with the same proxy/registrar.

MS 301 may place a call to intelligent client 306 by sending a SIP INVITE message containing a phone number (or other identifier) of the called party to an originating SIP proxy server in the network. The SIP INVITE message may also contain an IP port number on MS 301 at which inbound media may be directed (i.e., a "listen port"), for example using RTP. The originating SIP proxy server will then consult some form of location service in the network (e.g., a domain name server) to determine contact information for the called party so it can route the call. The proxy server will also consult with user profiles database 338 to determine that the called party is a subscriber to ringback-content service. As with the circuit-based call described above, the profile may be supplied as part of a general authorization transaction during call setup. The originating proxy server will then forward the SIP INVITE to intelligent client 306, possibly by way of one or more other, intervening proxy servers, including a terminating one that serves client 306.

Upon receiving the SIP INVITE, intelligent client station 306 may then respond with a SIP 180 RINGING message, which will be routed back toward MS 301, by way of the originating proxy server. The originating SIP proxy server will respond to the SIP 180 RINGING message by invoking ringback server 336 to transmit ringback tone and a trigger to MS 301. For instance, for inband transmission, the SIP proxy server may send to ringback server 336 a SIP INVITE message containing the listen port on MS 301, in order to set up a media session to MS 301. Alternatively, the ringback tone and trigger could be sent by ringback server 336 to MS 301 in a signaling message, out of band from the media stream. Still further, the ringback tone could be sent inband, and the trigger sent out of band. Other arrangements are possible as well.

Ringback will continue until the called party answers the call, signaled by a SIP 200 OK message from intelligent client 306 sent back to MS 301 by way of the originating proxy server. The originating proxy server may then cause ringback server 336 to cease playing (or otherwise transmitting) the ringback tone and trigger. The call session between the calling and called party may then proceed as usual.

As with the circuit-based call, the MS 301 will generate a request for content download in response to receiving the trigger, and transmit the request to content server 340. These actions, as well as the subsequent download of content from content server 340 to MS 301 and access/display of the content on MS 301 may be substantially similar to those described for the exemplary circuit-based call. For the packet-based call, content server 340 may be identified by an IP address or URL, for example, and the download may be carried out over the packet network 322 using standard IP protocols, such FTP, or within the context of a web-based session. Other methods and means are possible as well.

Once the content is downloaded to MS 301, the client station may then play or access the content in the same or similar manner as described in the circuit-based call.

Operation of ringback-content service may also be carried out in the preferred embodiment for a call that interconnects a packet-based call with a circuit-based call. In this case, all of the aspects described above apply to the mixed-mode call, and one or more network gateway device, such as GW 334, may be used to translate different signaling protocols and transcode different media transport protocols. For example, a SIP device may originate a call to a circuit-cellular phone, or vice versa. In either case, GW 334 may include both a signaling gateway function to translate between SIP and ISUP, and a media gateway function to transcode between the respective encoding protocols (i.e., codecs) applied to RTP streams and TDM samples. Alternatively, GW 443 may be representative of separate signaling gateways and media gateways. Other translations and transcodings are possible as well. These functions and methods are well-known in the art, and not described further here. Each device in such a call would communicate with the network as described above for the respective types of calls, and the calling client would ultimately receive the content download.

Exemplary Client Station and Network Server Device

Figure 5:
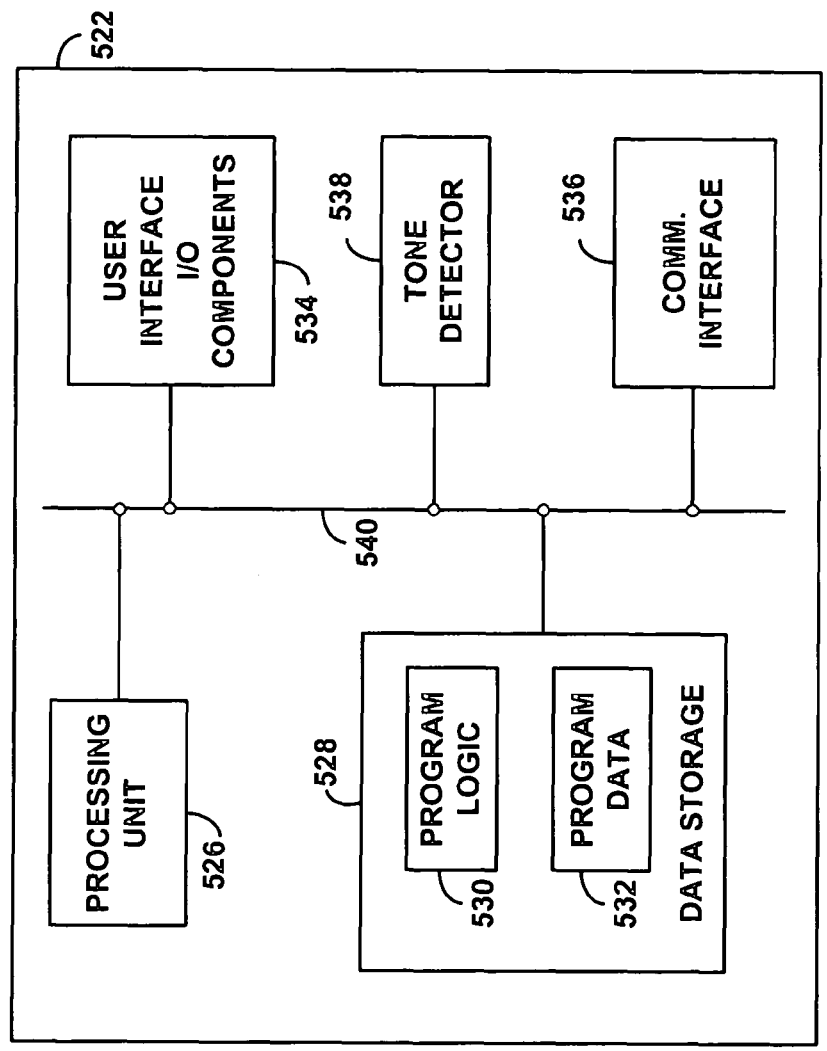
FIG. 5 is an exemplary illustration of the functional architecture of a client station.

FIG. 5 is a simplified block diagram depicting functional components of an example user communication device (UCD) 522 that may be arranged to request and subsequently receive content download from a network content server in response to receiving a trigger during call setup. The example UCD 522, representative of MS 301, 302, or intelligent clients 306, 308, for example, could be a cell phone, a personal digital assistant (PDA), a pager, a wired or wirelessly-equipped notebook computer, or any other sort of device. As shown in FIG. 5, the example UCD 522 includes user-interface I/O components 534, a communication interface 536, a tone detector 538, a processing unit 526, and data storage 528, all of which may be coupled together by a system bus 540 or other mechanism.

The user-interface I/O components 534 of the UCD are the parts of the device that interface directly with a user, i.e., the components that receive input from a user and/or provide output to a user. These may include, but are not limited to, a microphone for audio input, a speaker for audio output, an LCD display for visual output, and a keypad for alpha-numeric input. In accordance with a preferred embodiment, user input could include, without limitation, user authorization to accept a download from the content server, and output could include, without limitation, playing or displaying content downloaded from the content server. The detailed arrangement and operation of these and other user-interface I/O components are well known in the art and therefore will not be described in detail here.

Communication interface 536 enables communication with a network, such as network 300 in FIG. 3, via one or more access networks, such as RAN 309 or landline packet access network 327, for example. As such, for access via RAN 309, for example, communication interface 536 may include a module, such as an MSM™-series chipset made by Qualcomm Inc. of San Diego, Calif., and an antenna. Further, communication interface 536 preferably supports wireless packet-data communications according to a well known standard such as cdma2000®. Alternatively or additionally, for access via landline packet access network 327, for example, communication interface 536 preferably supports other air interface protocols, including those for wireless local area network access, such as wireless Ethernet (IEEE 802.11) and WiMax, for example. Still further, for access via landline packet access network 327, for example, communication interface 536 could support wired access, such as Ethernet.

Processing unit 526 comprises one or more general-purpose processors (e.g., INTEL microprocessors) and/or one or more special-purpose processors (e.g., dedicated digital signal processor, application specific integrated circuit, etc.). In turn, the data storage 528 comprises one or more volatile and/or non-volatile storage components, such as magnetic or optical memory or disk storage. Data storage 528 can be integrated in whole or in part with processing unit 526, as cache memory for instance. In the exemplary embodiment, as shown, data storage 528 is configured to hold both program logic 530 and program data 532.

Program logic 530 preferably comprises machine language instructions that define routines executable by processing unit 526 to carry out various functions described herein. By way of example, with UCD 522 representing MS 301, the program logic may be executable to communicate with communication interface 526 in order to set up a circuit-based phone call via MSC 314 by way of BTS 310 and BSC 312, or to establish a packet data session via PDSN 318 by way of BTS 310, BSC 312, and PCF 316. As another example, the program logic and communication interface may operate cooperatively to carry out trigger-initiated download of content from content server 340.

Tone detector 538 may comprise signal-processing hardware and software capable of detecting and decoding DTMF tones transmitted from the network, and received at UCD 522 via communication interface 536. Tone detection is a typical function of a client station such as MS 301, 302, and tone detector 538 may therefore be integrated within processing unit 526. The output of tone detector 538 may comprise a trigger, or a pattern that may be used in reconstructing a trigger by logic executing on processing unit 526.

Without loss of generality, exemplary operation of UCD 522 may be illustrated by taking UCD 522 to represent a wireless cellular phone, such as MS 301, and considering a wireless-cellular call placed from the wireless cellular phone to a subscriber to download-content service. It should be understood that aspects of operation specific to placement of a wireless circuit-cellular call could easily be adapted to a packet-based call using a wireless packet data connection, or WLAN or wired Ethernet access, as described above, for example. In the follow description, it is understood that all communications to/from the network are via communication interface 536.

According to a preferred embodiment, a user will typically place the call via keypad input in user-interface I/O components 534, and the call will proceed as described above. During the ringback period, the trigger may be embedded in the ringback tone as DTMF tones, for example. These will in turn be detected by tone detector 538, which provides the decoded signals to processing unit 526. Processing unit 526 will preferably execute instructions from program logic 530 that may recognize the decoded signals as a trigger, and responsively invoke additional or different instructions for the purpose of generating a request for content download. As described above, the request may include information in the trigger, including the address of the network content server. Once the request is generated, further instructions will preferably cause the request to be transmitted to content server 340 via communication interface 536.

Upon processing of the request, content server 340 may then download the requested content to UCD 522. The transmitted content will preferably be received by UCD 522, again via communication interface 536, and stored in program data 532, for example. Once the download is complete, instructions stored in program logic 530 may then be executed by processing unit 526 that play or display the downloaded content. For example, if the downloaded content is an audio file, the instructions may execute a media-player program that outputs the audio file via the speaker in user-interface I/O components 534. As described earlier, other forms of content and corresponding media-player (or other) programs are also possible. Note that other aspects of operation of UCD 522 related to call setup and call activity, such as signaling, bearer-channel processing, and media encoding and decoding, have been omitted for the sake of brevity. These operational aspects are well-known in the art and not considered further here.

Figure 6:
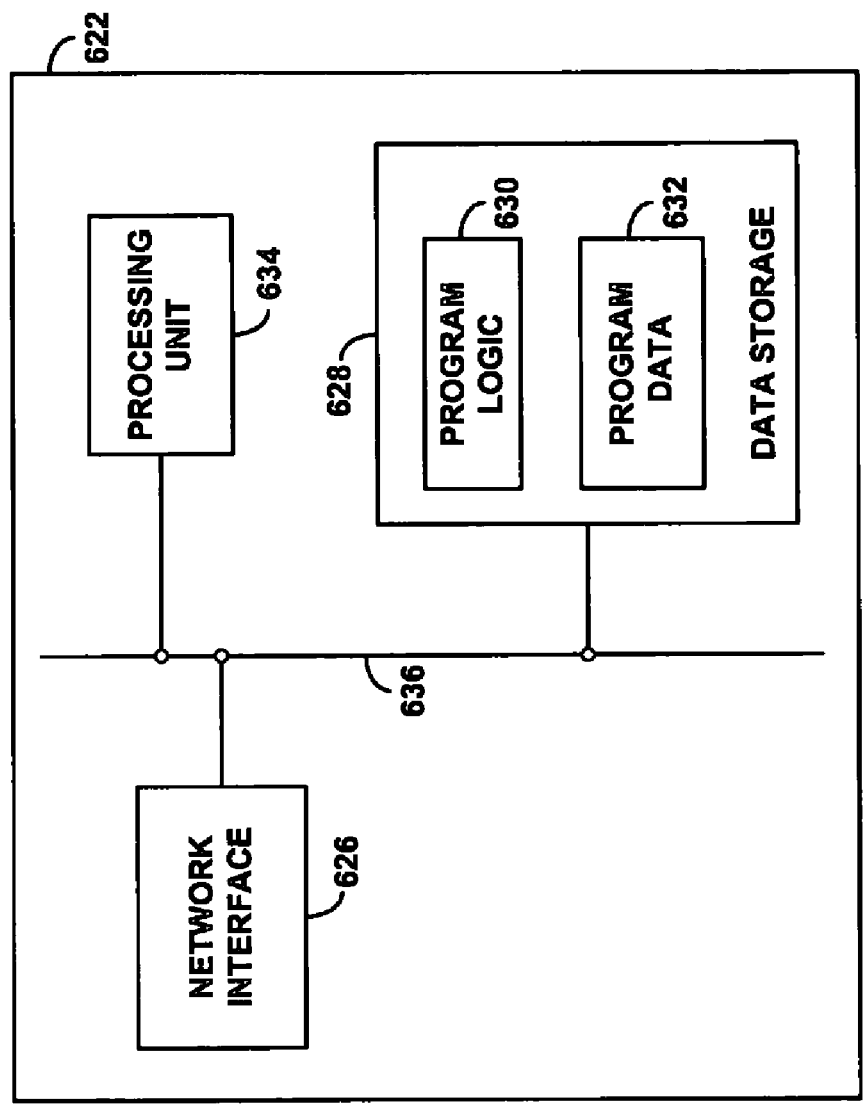
FIG. 6 is an exemplary illustration of the functional architecture of a content server, and may also be taken as representative of the functional architecture of a ringback server.

FIG. 6 is a simplified block diagram depicting functional components of an example content server 622 arranged to carry out its functions. As shown in FIG. 6, the example content server 622, representative of content server 340 FIG. 3, for example, includes a network interface 626, a processing unit 634, and data storage 628, all of which may be coupled together by a system bus 636 or other mechanism. In addition, the content server may also include external storage, such as magnetic or optical disk storage, although this is not shown in FIG. 6.

Network interface 626 enables communication on a network, such as a packet network. As such, network interface 626 may take the form of an Ethernet network interface card that can be coupled with a router or switch to a network such as core network 320, for example, or connected to a subnet, which in turn is couple to core network 320. By way of example, the subnet could be a LAN that interconnects components that comprise a service-delivery subsystem. Example components could include external disk storage for content in the form of data files, and an operator interface for provisioning the subsystem. Alternatively, network interface 626 may take other forms, providing for wired and/or wireless communication on a network or a subnet.

Processing unit 634 comprises one or more general purpose processors and/or one or more special purpose processors. And data storage 628 comprises one or more volatile and/or non-volatile storage components, which can be integrated in whole or in part with processing unit 634. As further shown, data storage 628 is equipped to hold program logic 630 and program data 632.

Program logic 630 preferably comprises machine language instructions that are executable by processing unit 634 to carry out various functions described herein. By way of example, the program logic 630 may be executable by processing unit 634 to receive a request from a client station, such as MS 301, for a download, arriving at network interface 626. Further, the program logic 630 is preferably executable by processing unit 634 to process the request and responsively download the requested content, again via network interface 626.

According to a preferred embodiment, a request for content download will arrive at network interface 626, the request having been generated and transmitted by a client station, such as MS 301 or intelligent client 306, in response to a trigger received by the client station during the ringback period for call setup of a call place by the client station to a subscriber of ringback-content service. A program executing according to instructions from program logic 630 in processing unit 634 may then analyze and process the request, for example authenticating the user and identifying and/or determining the requested content, among other steps. Assuming the request is deemed legitimate, the executing program may then retrieve the requested content, possibly from external storage (not shown) via network interface 626, and thereafter transmit the content, again via network interface 626, to the requesting client station. One skilled in the art will recognize that the operation of content server 622 with respect to receiving and processing the request, as well as the subsequent download, could be put into practice in numerous ways.

Additional aspects of operation of content server 622 may include operator provisioning to enable specific content stored to be modified, updated, or augmented, for example. Operator provisioning could be carried out using a web-based user interface from an external computer workstation (not shown) connected to content server 622 via network interface 626, for instance. Other means for operator provisioning are be possible. Further, there may be additional and/or alternative aspects of operation of content server 622 for manipulating the stored content.

Although the block diagram of in FIG. 6 as described applies to operation of a content server, the same block diagram, but with slightly different interpretation of block functions, may be applied to the operation of a ringback server, such as ringback server 336 in FIG. 3. In the case of a ringback server, the program logic executed by the processing unit preferably implements the operations of the ringback server 336 as described above in connection with ringback-content service, for example. Additionally, the network interface may be used for communication with a call server, such as an MSC, in order to receive a signaling message to play a ringback tone and trigger, and subsequently used to transmit the ringback tone and trigger to the calling client station. Further, in this case, program data will preferably comprise storage of ringback tones (or other ringback media) and triggers. As with the content server, provisioning (via the network interface) may be used to manipulate the stored ringback media and triggers, for example. Further, the provisioning interface may support some form of subscriber input in order to enable subscriber customization of ringback tones, for instance. Again, one skilled in the art will recognize that the operation of the ringback server with respect to ringback-content service could be put into practice in numerous ways.

CONCLUSION

An exemplary embodiment of the present invention has been described above. Those skilled in the art will understand, however, that changes and modifications may be made to the embodiment described without departing from the true scope and spirit of the invention, which is defined by the claims.

We claim:

1. A method of providing content to a client station comprising:
   during setup of a call placed by the client station, transmitting a trigger to the client station within ringback provided to the client station during a ringback period for the call, wherein transmitting the trigger comprises transmitting the trigger in pieces interleaved within the ringback so as to ensure playout of at least a portion of the ringback before all of the pieces of the trigger are received by the client station; and
   thereafter receiving from the client station a content-download request generated by the client station in response to the trigger, and providing the content to the client station in response to the content-download request,
   wherein the trigger indicates a network address of a content server, and wherein receiving from the client station the content-download request comprises receiving a content-download request addressed to the content server at the network address.

2. The method of claim 1, wherein the content is related to ringback that is played out to the client station during the ringback period.

3. The method of claim 2, wherein the ringback played out to the client station during the ringback period is a portion of media, and the content comprises a more complete version of the media.

4. The method of claim 2, wherein the ringback played out to the client station during the ringback period is audio, and the content comprises video related to the audio.

5. A method of downloading content to a client station comprising:
   during a ringback period of a call setup of a call placed by the client station, receiving into the client station a trigger transmitted from a network entity, wherein receiving the trigger during the ringback period comprises receiving the trigger just before playout of ringback to the client station; and
   in response to the trigger, the client station downloading content that is distinct from the ringback,
   wherein the trigger indicates a network address of a content server, and wherein downloading the content comprises downloading the content from the content server at the network address.

6. The method of claim 1, wherein transmitting the trigger comprises transmitting the trigger during playout of ringback to the client station.

7. The method of claim 1, wherein the trigger comprises at least one of a human-audible tone and a digital parameter.

8. The method of claim 1, wherein providing the content to the client station comprises:
   prompting a user of the client station for authorization to download the content, and then downloading the content upon receipt of user authorization.

9. The method of claim 1, wherein the content comprises at least one of (i) audio, (ii) video, (iii) program logic, and (iv) data usable by the client station to allow playout of other content that was stored on the client station before placement of the call.

10. The method of claim 5, wherein downloading the content comprises downloading the content during the ringback period for the call.

\* \* \* \* \*